(12) United States Patent
Yamasaki

(10) Patent No.: US 10,306,160 B2
(45) Date of Patent: May 28, 2019

(54) IMAGE PICKUP APPARATUS, IMAGE PICKUP METHOD, AND STORAGE MEDIUM

(71) Applicant: CANON KABUSHIKI KAISHA, Tokyo (JP)

(72) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 15/807,684

(22) Filed: Nov. 9, 2017

(65) Prior Publication Data

US 2018/0139397 A1 May 17, 2018

(30) Foreign Application Priority Data

Nov. 15, 2016 (JP) .................................. 2016-222579

(51) Int. Cl.
| | |
|---|---|
| *H04N 5/343* | (2011.01) |
| *H04N 5/353* | (2011.01) |
| *H04N 5/355* | (2011.01) |
| *H04N 5/3745* | (2011.01) |
| *H04N 5/378* | (2011.01) |

(52) U.S. Cl.
CPC .......... *H04N 5/343* (2013.01); *H04N 5/3535* (2013.01); *H04N 5/35545* (2013.01); *H04N 5/35581* (2013.01); *H04N 5/37452* (2013.01); *H04N 5/378* (2013.01)

(58) Field of Classification Search
None
See application file for complete search history.

(56) References Cited

U.S. PATENT DOCUMENTS

| 8,154,619 | B2 * | 4/2012 | Satoh | H04N 5/2353 |
| | | | | 348/222.1 |
| 2009/0109323 | A1 * | 4/2009 | Muraki | G03B 7/003 |
| | | | | 348/362 |
| 2009/0262215 | A1 * | 10/2009 | Sano | H04N 5/2353 |
| | | | | 348/229.1 |
| 2010/0201862 | A1 * | 8/2010 | Hatabu | H04N 5/3535 |
| | | | | 348/311 |
| 2011/0096216 | A1 * | 4/2011 | Kawai | G03B 7/091 |
| | | | | 348/296 |

(Continued)

FOREIGN PATENT DOCUMENTS

JP 2010-157893 A 7/2010

*Primary Examiner* — James M Hannett
(74) *Attorney, Agent, or Firm* — Cowan, Liebowitz & Latman, P.C.

(57) ABSTRACT

An image pickup apparatus, including a controller, the controller generating a first image by a first signal which is based on charge obtained by a first charge accumulation performed within a first time period corresponding to one frame of an image group, the controller generating a second image using at least a second signal which is based on the charge obtained by the plurality of times of second charge accumulations performed within a first time period, and the controller, in a first case where a time of the first charge accumulation is less than a predetermined time, generating a second image by the second signal without using the first signal, and in a second case where the time of the first charge accumulation is the predetermined time or more, generating the second image using the first signal and the second signal.

11 Claims, 10 Drawing Sheets

(56) References Cited

U.S. PATENT DOCUMENTS

2014/0027613 A1\* 1/2014 Smith ................ H04N 5/2352
            250/208.1
2014/0218575 A1\* 8/2014 Yanai ................ H04N 5/3532
            348/296

\* cited by examiner

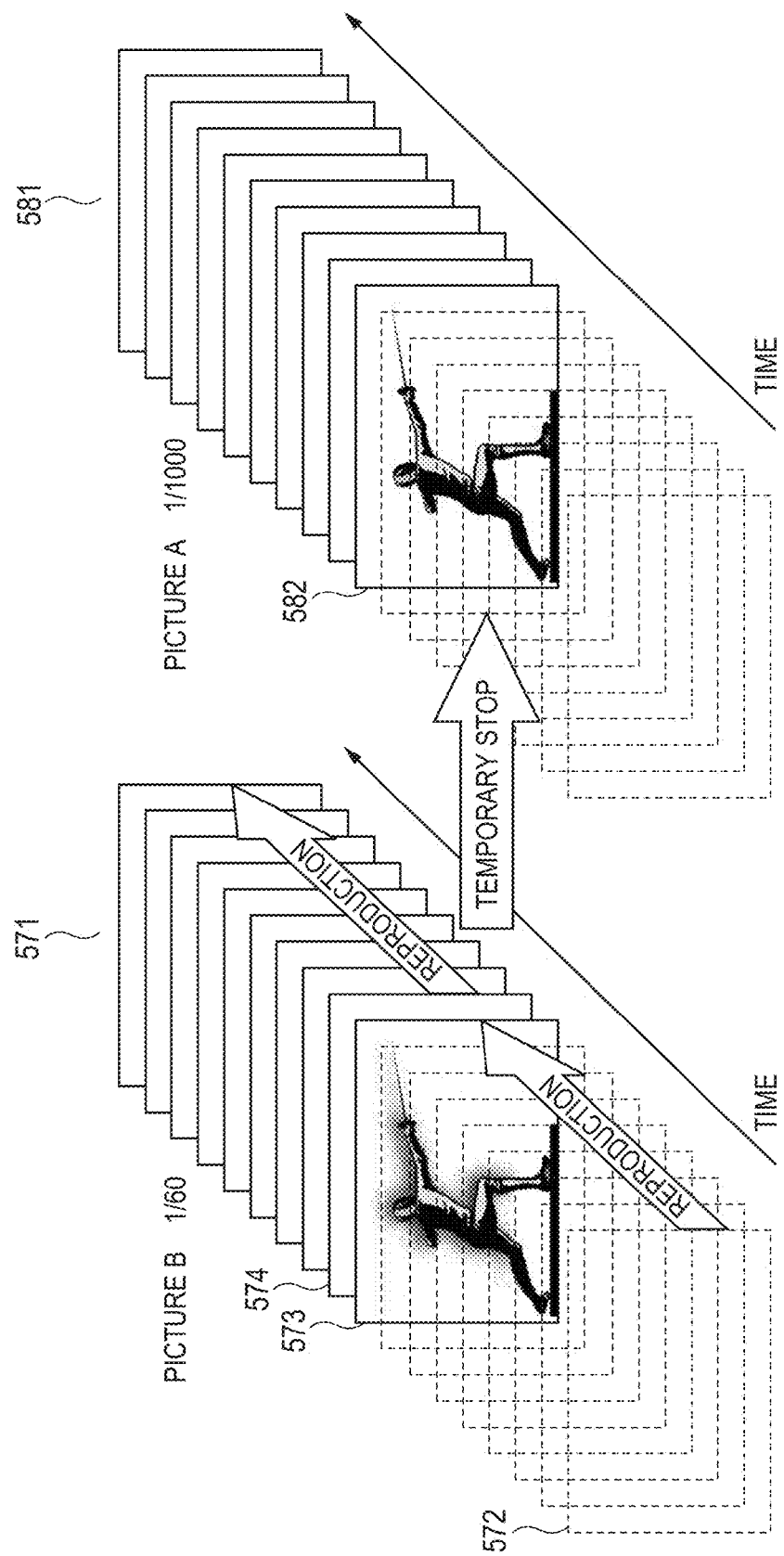

IMAGE PICKUP APPARATUS, IMAGE PICKUP METHOD, AND STORAGE MEDIUM

BACKGROUND OF THE INVENTION

Field of the Invention

The present disclosure relates to an image pickup apparatus, an image pickup method, and a storage medium.

Description of the Related Art

Recently, imaging simultaneously by one image pickup apparatus an image group suited to a still image and an image group suited to a moving image, has been proposed The image group suited to the moving image is employed for appreciation of the moving image. An arbitrary image of the image group suited to the still image is selected by a user, and the selected image is employed as the still image.

On the other hand, reducing a dark current by transferring a plurality of times to an accumulation section a charge converted by a photoelectric converter and accumulating altogether in the accumulation section the charge that has been transferred the plurality of times, has been disclosed in Japanese Patent Application Laid-Open No. 2010-157893.

However, exposure times appropriate for when obtaining the image suited to the still image and the image group suited to the moving image differ greatly. Therefore, it is not necessarily easy for the image group suited to the still image and the image group suited to the moving image to be acquired using a common photoelectric converter.

SUMMARY OF THE INVENTION

According to an aspect of an embodiment, there is provided an image pickup apparatus, including a pixel array having a plurality of pixels arranged two-dimensionally therein, the plurality of pixels each including: a photoelectric converter that performs photoelectric conversion; a first charge holding section that holds a charge obtained due to a first charge accumulation by the photoelectric converter; and a second charge holding section that holds a charge obtained due to a plurality of times of second charge accumulations by the photoelectric converter; and a controller, the controller generating a first image by a first signal which is based on the charge obtained by the first charge accumulation performed within a first time period corresponding to one frame of an image group, the controller generating a second image using at least a second signal which is based on the charge obtained by the plurality of times of second charge accumulations performed within the first time period, and the controller, in a first case where a time of the first charge accumulation is less than a predetermined time, generating the second image by the second signal without using the first signal, and in a second case where the time of the first charge accumulation is the predetermined time or more, generating the second image using the first signal and the second signal.

According to another aspect of an embodiment, there is provided an image pickup method, including generating a first image by a first signal which is based on a charge obtained due to a first charge accumulation by a photoelectric converter performed within a first time period corresponding to one frame of an image group; and generating a second image using at least a second signal which is based on a charge obtained due to a plurality of times of second charge accumulations by the photoelectric converter performed within the first time period, the second image, in a first case where a time of the first charge accumulation is less than a predetermined time, being generated by the second signal without using the first signal, and the second image, in a second case where the time of the first charge accumulation the predetermined time or more, being generated using the first signal and the second signal.

According to another aspect of an embodiment, there is provided a non-transitory computer-readable storage medium having stored thereon a program for causing a computer to execute: generating a first image by a first signal which is based on a charge obtained due to a first charge accumulation by a photoelectric converter performed within a first time period corresponding to one frame of an image group; and generating a second image using at least a second signal which is based on a charge obtained due to a plurality of times of second charge accumulations by the photoelectric converter performed within the first time period, the second image, in a first case where a time of the first charge accumulation is less than a predetermined time, being generated by the second signal without using the first signal, and the second image, in a second case where the time of the first charge accumulation is the predetermined time or more, being generated using the first signal and the second signal.

Further features of the present invention will become apparent from the following description of exemplary embodiments with reference to the attached drawings.

BRIEF DESCRIPTION OF THE DRAWINGS

FIG. 9 is a view showing an application example of an image group of pictures A and an image group of pictures B.

DESCRIPTION OF THE EMBODIMENTS

Preferred embodiments of the present invention will now be described in detail in accordance with the accompanying drawings. The present invention is not limited to the embodiment below.

Embodiment

Figure 1A:
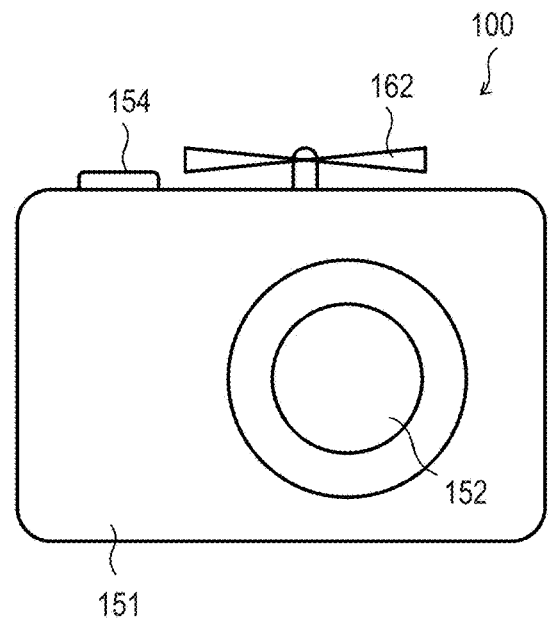
FIGS. 1A and 1B are external views showing an image pickup apparatus according to an embodiment.
Figure 1B:
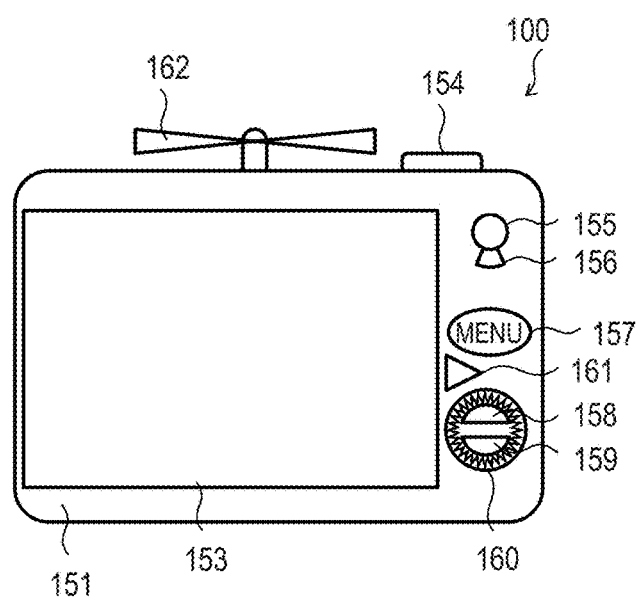

An image pickup apparatus and an image pickup method according to an embodiment will be described below using the drawings. FIGS. 1A and 1B are external views showing the image pickup apparatus according to the present embodiment. FIG. 1A is a front view, and FIG. 1B is a back view. Description will be made here exemplifying the case where an image pickup apparatus 100 according to the present embodiment is a digital still motion camera. The digital still motion camera is an image pickup apparatus developed by a concept of eliminating a barrier between photographing of a moving image (moving picture) and photographing of a still image (still picture).

As shown in FIGS. 1A and 1B, the image pickup apparatus 100 has a body (casing, main body) 151. A front surface of the body 151 is provided with a photographing optical system (lens unit) 152. An upper section of the body 151 is provided with a switch 154 and a propeller 162. A back surface of the body 151 is provided with a display 153, a switch 155, a photographing mode selection lever 156, a menu button 157, up/down switches 158, 159, a dial 160, and a reproduction button 161.

The body 151 stores internally the likes of various function components such as an image pickup element 184 (refer to FIG. 2) or a shutter apparatus (not illustrated). The photographing optical system 152 is for imaging an optical image of a subject on a light-receiving section (light-receiving surface) of the image pickup element 184. The display 153 is configured by display elements for displaying photography information or an image. A movable mechanism for changing an orientation of a display screen may be provided in the display 153. The display 153 preferably includes a display luminance range sufficient for an image of broad dynamic range to be displayable without a luminance range being suppressed.

The switch 154 is a shutter button employed mainly when performing photographing of a still image. The switch 155 a button for performing start and stop of photographing of a moving image. The photographing mode selection lever 156 is a switching switch for selecting a photographing mode. The menu button 157 is a button for shifting to a function setting mode that performs function setting of the image pickup apparatus 100. The up/down switches 158, 159 or the dial 160 are employed in the likes of change of various kinds of setting values. The reproduction button 161 is a button for shifting to a reproduction mode that reproduces on the display 153 an image recorded in a recording medium stored in the image pickup apparatus 100. The propeller 162 is for floating the image pickup apparatus 100 in midair for performing photographing from midair.

Figure 2:
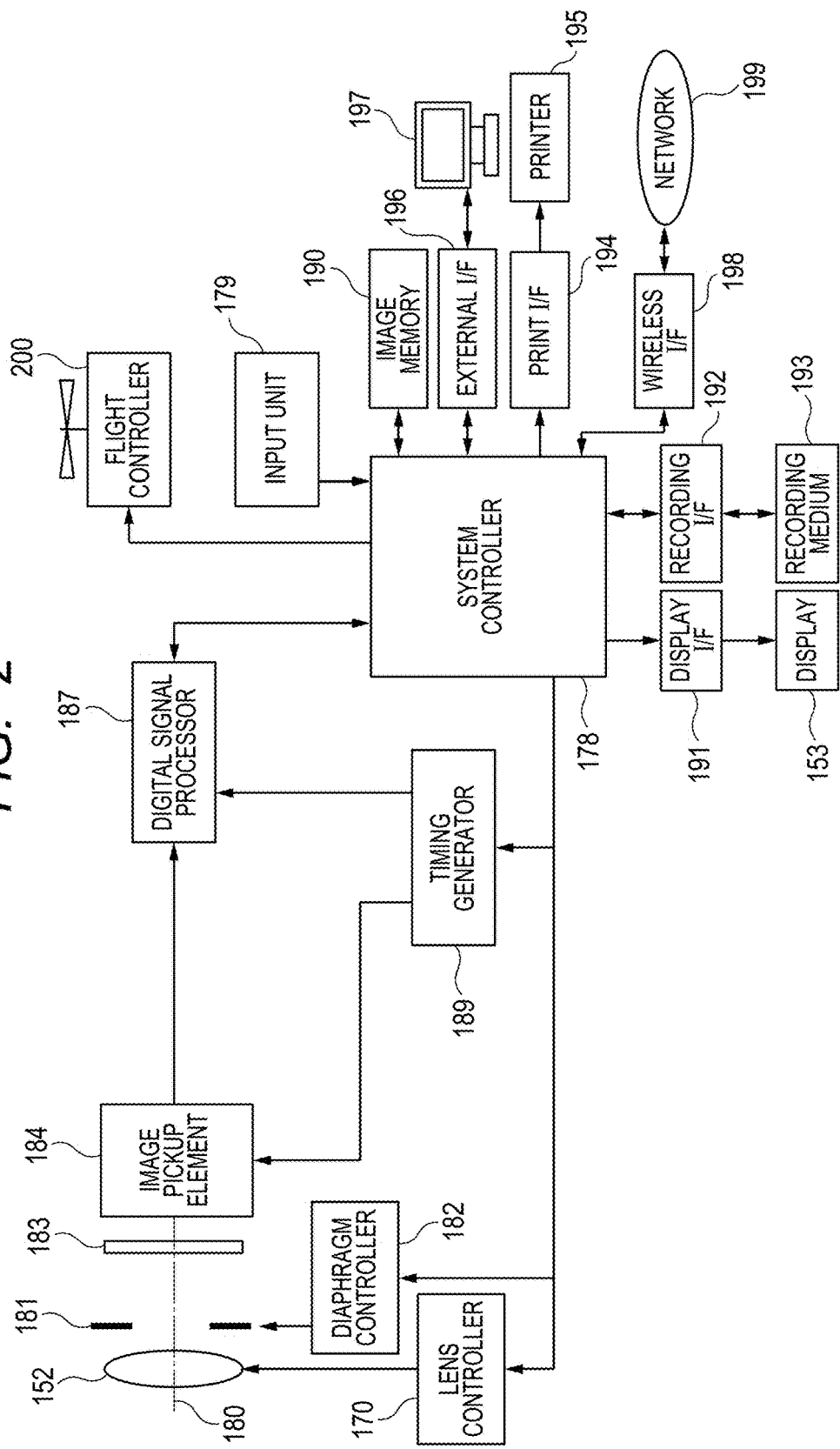
FIG. 2 is a block diagram showing a schematic configuration of the image pickup apparatus according to the embodiment.

FIG. 2 is a block diagram showing a schematic configuration of the image pickup apparatus 100 according to the present embodiment. As shown in FIG. 2, the image pickup apparatus 100 has a diaphragm 181, a diaphragm controller 182, a lens controller 170, an optical filter 183, the image pickup element 184, a digital signal processor 187, and a timing generator 189. In addition, the image pickup apparatus 100 has a system controller 178, an input unit 179, an image memory (picture memory) 190, and a flight controller 200. Moreover, the image pickup apparatus 100 has a display interface 191, the display 153, a recording interface 192, a print interface 194, an external interface 196, and a wireless interface 198.

The image pickup element 184 is for converting an o image of a subject imaged by the photographing optical system 152, into an electrical signal, that is, an image signal (picture signal). The image pickup element 184 is not particularly limited, but, for example, has a pixel number, a signal readout speed, a color gamut, a dynamic range, and so on, that are sufficient to satisfy a standard of UHDTV (Ultra High Definition Television). The photographing optical system 152 may be detachable from the body 151, or may be non-detachable from the body 151. The diaphragm 181 is for regulating an amount of light passing through the photographing optical system 152. The diaphragm controller 182 is for controlling the diaphragm 181. The lens controller 170 is for driving a focus lens (not illustrated) provided in the photographing optical system 152 and thereby performing focusing adjustment. The optical filter 183 is for limiting a wavelength of light entering the image pickup element 184 or a spatial frequency of an optical image imaged in the image pickup element 184. The photographing optical system 152, the diaphragm 181, the optical filter 183, and the image pickup element 184 are disposed on an optical axis 180 of the photographing optical system 152.

The digital signal processor 187 performs various kinds of correction processing on a digital image signal, that is, on digital image data outputted from the image pickup element 184, and performs compression processing on image data that has undergone the various kinds of correction processing. The timing generator 189 outputs various kinds of timing signals to the image pickup element 184 or the digital signal processor 187. The system controller 178 executes various kinds of arithmetic processing and governs control of the image pickup apparatus 100 overall. The system controller 178 is configured by a CPU (Central Processing Unit), for example. The system controller 178 and the timing generator 189 may function as a controller. As will be mentioned later, the system controller 178 generates a first image, that is, an image suited to a still image, by a first signal based on a charge transferred to a charge holding section 507A (refer to FIG. 3B) from a photoelectric converter 500 (refer to FIG. 3B). Moreover, as will be mentioned later, the system controller 178 generates a second image, that is, an image suited to a moving image, using at least a second signal based on a charge transferred over a plurality of times to a charge holding section 507B (refer to FIG. 3B) from the photoelectric converter 500. As will be mentioned later, the system controller 178 operates as follows in a first case when a first time which is a time of a first charge accumulation performed in the photoelectric converter 500 for generating the charge to be transferred to the charge holding section 507A is less than a predetermined time. That is, in such a case, the system controller 178 generates the second image by the second signal without using the first signal. Note that the predetermined time is a time based on a time of an interval between a plurality of times of second charge accumulations performed in the photoelectric converter 500 for generating the charge to be transferred to the charge holding section 507B. As will be mentioned later, in a second case when the first time is the predetermined time or more, the system controller 178 generates the second image using the first signal and the second signal. The image memory 190 stores image data temporarily.

The display interface 191 is an interface for displaying a photographed image in the display 153. The likes of a liquid crystal display, for example, is employed in the display 153. A recording medium 193 is for recording the likes of image data or additional data and employs the likes of a semiconductor memory. The recording medium 193 may be detachable from the image pickup apparatus 100, or may be non-detachable from the image pickup apparatus 100. The recording interface 192 is an interface for performing write or readout of image data, and so on, to/from the recording medium 193. The external interface 196 is an interface for communicating with an external appliance such as an external computer 197. The print interface 194 is an interface for outputting a photographed image to a printer 195 such as a small-sized ink-jet printer, and printing the photographed image. The wireless interface 198 is an interface for communicating with a network 199 such as an internet. The input unit 179 includes various kinds of switches such as the switches 154, 155, the photographing mode selection lever 156, and the reproduction button 161. The flight controller 200 is for controlling the propeller 162 to fly the image pickup apparatus 100 in order to perform photographing from midair. Note that a configuration may be adopted where the flight controller 200 or the propeller 162 is provided in an airframe provided separately from the body 151, and the image pickup apparatus 100 according to the present embodiment is attached to such an airframe. Moreover, when it is not required to perform photograph in from midair, it is not required for the flight controller 200 or the propeller 162 to be included.

Figure 3A:
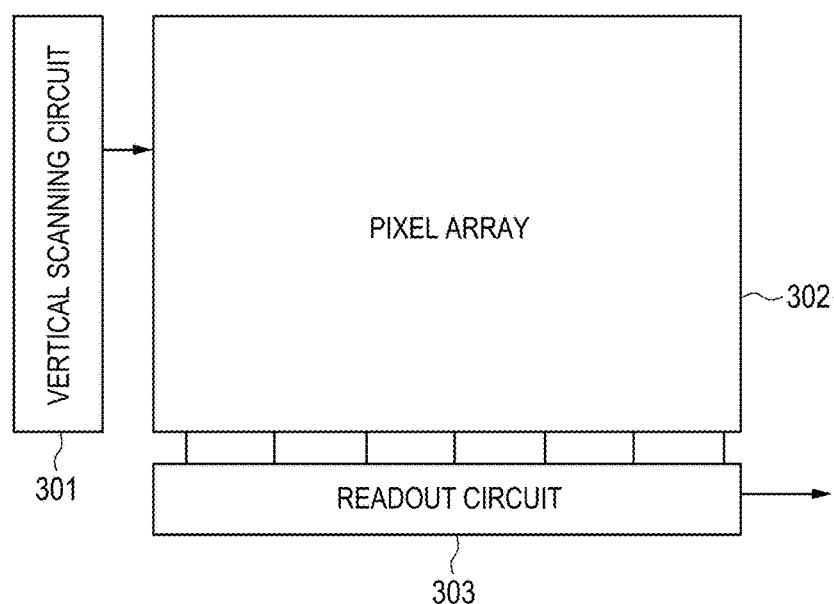
FIGS. 3A and 3B are circuit diagrams showing parts of an image pickup element.
Figure 3B:
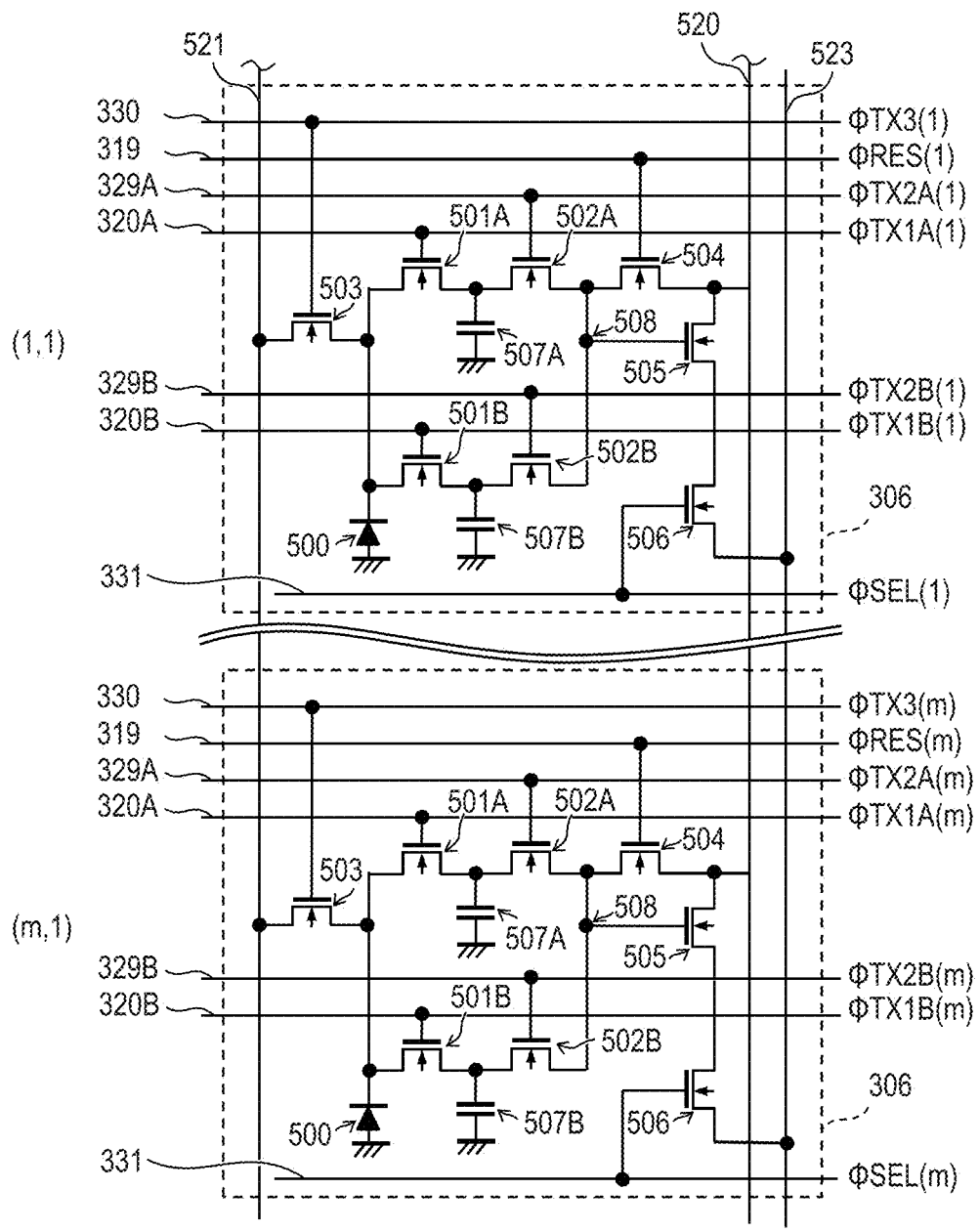

FIGS. 3A and 3B are circuit diagrams showing parts of the image pickup element 184. FIG. 3A shows a pixel array and a peripheral circuit of the pixel array. As shown in FIG. 3A, the image pickup element 184 includes a pixel array 302, a vertical scanning circuit 301, and a readout circuit 303. A plurality of pixels 306 (refer to FIG. 3B) are arranged in a matrix, that is, two-dimensionally in the pixel array 302. The vertical scanning circuit 301 is disposed adjacently in a row direction to the pixel array 302. The vertical scanning circuit 301 applies predetermined control signals to various kinds of control lines arranged so as to extend in the row direction, and controls in a row unit the plurality of pixels 306 positioned in each row of the pixel array 302. The readout circuit 303 is provided with the likes of a correlated double sampling (CDS) circuit that removes noise, an amplifier that regulates signal gain, and an A/D converter that converts an analog signal into a digital signal. Therefore, a digital signal is outputted from the image pickup element 184 according to the present embodiment. Note that it is also possible to configure such that an analog front end is provided separately from the image pickup element 184, and that an output of the analog front end is supplied to the digital signal processor 187. In this case, the A/D converter, and so on, is provided in the analog front end.

FIG. 3B is a view showing the pixel 306 arranged in the pixel array 302. In FIG. 3B, in order to simplify the drawing, two pixels 306 of the numerous pixels 306 provided in the pixel array 302 are selected to be shown. FIG. 3B shows the pixel 306 positioned in a first row and a first column, that is, the pixel 306 positioned in a coordinate of (1, 1), and the pixel 306 positioned in an m-th row and the first column, that is, the pixel 306 positioned in a coordinate of (m, 1). Note that since configurations of each of the pixels 306 are all equivalent, FIG. 3B appropriately employs the same symbols. As shown in FIG. 3B, each of the pixels 306 includes the photoelectric converter 500, transfer transistors 501A, 501B, the charge holding sections (signal holding sections) 507A, 507B, and transfer transistors 502A, 502B. A photodiode, for example, is employed as the photoelectric converter 500. In the present embodiment, one photoelectric converter 500 is provided with two charge holding sections 507A, 507B. The charge holding sections 507A, 507B are each configured by a capacitor, for example. Furthermore, each of the pixels 306 includes a reset transistor (transfer transistor) 503, a floating diffusion region 508, a reset transistor 504, an amplifier transistor 505, and a select transistor 506.

An anode of the photoelectric converter 500 is connected to a ground line, and a cathode of the photoelectric converter 500 is connected to a source of the transfer transistor 501A, a source of the transfer transistor 501B, and a source of the reset transistor 503. A drain of the transfer transistor 501A is connected to one end of the charge holding section 507A and a source of the transfer transistor 502A. A drain of the transfer transistor 501B is connected to one end of the charge holding section 507B and a source of the transfer transistor 502B. The other end of the charge holding section 507A and the other end of the charge holding section 507B are connected to a ground line. A connection node of a drain of the transfer transistor 502A, a drain of the transfer transistor 502B, a source of the reset transistor 504, and a gate of the amplifier transistor 505 corresponds to the floating diffusion region 508. A drain of the reset transistor 504 and a drain of the amplifier transistor 505 are connected to a power supply line 520. A source of the ampler transistor 505 is connected to a drain of the select transistor 506. A source of the select transistor 506 is connected to an output signal line 523. The source of the amplifier transistor 505 is connected to an unillustrated current source via the select transistor 506 and the output signal line 523. A source follower circuit is configured by the ampler transistor 505 and the current source. When a gate of the select transistor 506 is set to an ON state, a signal based on a potential of the gate of the amplifier transistor 505 is outputted via the output signal line 523. A drain of the reset transistor 503 is connected to a power supply line 521.

Each of the pixels 306 is connected to reset control lines 319, 330, transfer control lines 320A, 320B, 329A, 329B, and a select control line 331 that are arranged so as to extend in the row direction from the vertical scanning circuit 301. The reset control line 319 is connected to a gate of the reset transistor 504. The transfer control lines 320A, 320E are respectively connected to gates of the transfer transistors 501A, 501B. The transfer control lines 329A, 329B are respectively connected to gates of the transfer transistors 502A, 502B. The reset control line 330 is connected to a gate of the reset transistor 503. The select control line 331 is connected to the gate of the select transistor 506. The reset control line 319 supplies the gate of the reset transistor 504 with a reset pulse φRES outputted from the vertical scanning circuit 301. The transfer control lines 320A, 320B respectively supply the gates of the transfer transistors 501A, 501B with transfer pulses φTX1A, φTX1B outputted from the vertical scanning circuit 301. The transfer control lines 329A, 329B respectively supply the gates of the transfer transistors 502A, 502B with transfer pulses φTX2A, φTX2B outputted from the vertical scanning circuit 301. The reset control line 330 supplies the gate of the reset transistor 503 with a reset pulse φTX3 outputted from the vertical scanning circuit 301. The select control line 331 supplies the gate of the select transistor 506 with a select pulse φSEL outputted from the vertical scanning circuit 301. Note that in FIG. 3B, a character in parentheses after the symbols φRES, φTX1A, φTX1B, φTX2A, φTX2B, φTX3, and φSEL indicates a row number.

The photoelectric converter 500 generates a charge by photoelectric conversion, and accumulates the generated charge. The transfer transistor 501A is for transferring to the charge holding section 507A the charge generated by the photoelectric converter 500. The charge holding section 507A holds the charge transferred via the transfer transistor 501A from the photoelectric converter 500. The transfer transistor 501B is for transferring to the charge holding section 507B the charge generated by the photoelectric converter 500. The charge holding section 507B holds the charge transferred via the transfer transistor 501B from the photoelectric converter 500. The transfer transistor 502A is for transferring to the floating diffusion region 508 the charge held by the charge holding section 507A. The transfer transistor 502B is for transferring to the floating diffusion region 508 the charge held by the charge holding section 507B. The floating diffusion region 508 holds the charge transferred via the transfer transistor 502 from the charge holding section 507A. Moreover, the floating diffusion region 508 holds the charge transferred via the transfer transistor 502B from the charge holding section 507B.

In the present embodiment, since one photoelectric converter 500 is provided with two charge holding sections 507A, 507B, it is possible for two kinds of images to be acquired. The first signal based on the charge held in the charge holding section 507A is employed in the first image, that is, the image suited to a still image. It is decided here that the first image will also be referred to as picture A. The second signal based on the charge held in the charge holding section 507B is employed in the second image, that is, the image suited to a moving image. It is decided here that the second image will also be referred to as picture B. Note that picture A and picture B are, strictly, images subsequent to having undergone a predetermined correction processing, or the like, but for convenience of description, a signal (image) prior to correction or in the middle of correction will sometimes also be written as picture A, picture B. Note that as will be mentioned later, it is not the case that the first signal is employed only in generation of the first image. As required, the first signal is employed also in generation of the second image.

A charge accumulation in the photoelectric converter 500 for obtaining the charge corresponding to the first signal, that is, the first charge accumulation, and a charge accumulation in the photoelectric converter 500 for obtaining the charge corresponding to the second signal, that is, the second charge accumulation, are performed exclusively. That is, when the first charge accumulation for obtaining the charge corresponding to the first signal is being performed in the photoelectric converter 500, the second charge accumulation for obtaining the charge corresponding to the second signal is not performed by the photoelectric converter 500. Transfer of the charge to the charge holding section 507A from the photoelectric converter 500 and transfer of the charge to the charge holding section 507B from the photoelectric converter 500 are also performed exclusively.

When the transfer pulse φTX1A of high level is outputted from the vertical scanning circuit 301, the transfer transistor 501A attains an ON state, and the photoelectric converter 500 and one end of the charge holding section 507A are electrically connected. When the transfer pulse φTX1B of high level is outputted from the vertical scanning circuit 301, the transfer transistor 501B attains an ON state, and the photoelectric converter 500 and one end of the charge holding section 507B are electrically connected. When the transfer pulse φTX2A of high level is outputted from the vertical scanning circuit 301, the transfer transistor 502A attains an ON state, and one end of the charge holding section 507A and the floating diffusion region 508 are electrically connected. When the transfer pulse φTX2B of high level is outputted from the vertical scanning circuit 301, the transfer transistor 502B attains an ON state, and one end of the charge holding section 507B and the floating diffusion region 508 are electrically connected. When the reset pulse φRES of high level is outputted from the vertical scanning circuit 301, the reset transistor 504 attains an ON state. When the reset pulse φRES is high level and the transfer pulses φTX2A, φTX2B are high level, the reset transistor 504 and the transfer transistors 502A, 502B attain an ON state. At this time, the charge holding sections 507A, 507B and the floating diffusion region 508 are reset. When the reset pulse φRES is high level but the transfer pulses φTX2A, φTX2B are low level, the reset transistor 504 is in an ON state, but the transfer transistors 502A, 502B are in an OFF state. At this time, the floating diffusion region 508 reset, without the charge holding sections 507A, 507B being reset.

When the reset pulse φTX3 outputted to the reset control line 330 from the vertical scanning circuit 301 becomes low level, the reset transistor 503 attains an OFF state, and the photoelectric converter 500 begins accumulation of a signal charge (charge) generated by photoelectric conversion. When the transfer pulse φTX1A of high level has been outputted to the transfer control line 320A from the vertical scanning circuit 301, the transfer transistor 501A attains an ON state, and the signal charge generated. In the photoelectric converter 500 is transferred to the charge holding section 507A. When subsequently the transfer pulse φTX1A becomes low level, the transfer transistor 501A attains an OFF state, and transfer of the signal charge to the charge holding section 507A from the photoelectric converter 500 finishes. When subsequently the transfer pulse φTX2A of high level is outputted to the transfer control line 329A from the vertical scanning circuit 301, the transfer transistor 502A attains an ON state, and the signal charge is transferred to the floating diffusion region 508 from the charge holding section 507A.

On the other hand, when the transfer pulse φTX1B of high level has been outputted to the transfer control line 320B from the vertical scanning circuit 301, the transfer transistor 501B attains an ON state, and the signal charge generated in the photoelectric converter 500 is transferred to the charge holding section 507B. When subsequently the transfer pulse φTX1B becomes low level, the transfer transistor 501B attains an OFF state, and transfer of the signal charge to the charge holding section 507B from the photoelectric converter 500 finishes. When subsequently the transfer pulse φTX2B of high level is outputted to the transfer control line 329B from the vertical scanning circuit 301, the transfer transistor 502B attains an ON state, and the signal charge is transferred to the floating diffusion region 508 from the charge holding section 507B. Note that as mentioned above, the first charge accumulation in the photoelectric converter 500 for obtaining the charge to be transferred to the charge holding section 507A and the second charge accumulation in the photoelectric converter 500 for obtaining the charge to be transferred to the charge holding section 507B are performed exclusively. Moreover, as mentioned above, transfer of the signal charge to the charge holding section 507A from the photoelectric converter 500 and transfer of the signal charge to the charge holding section 507B from the photoelectric converter 500 are performed exclusively.

When the select transistor 506 attains an ON state by the select pulse φSEL of high level outputted from the vertical scanning circuit 301, a signal based on a gate potential of the amplifier transistor 505 is outputted via the select transistor 506 and the output signal line 523.

Figure 4:
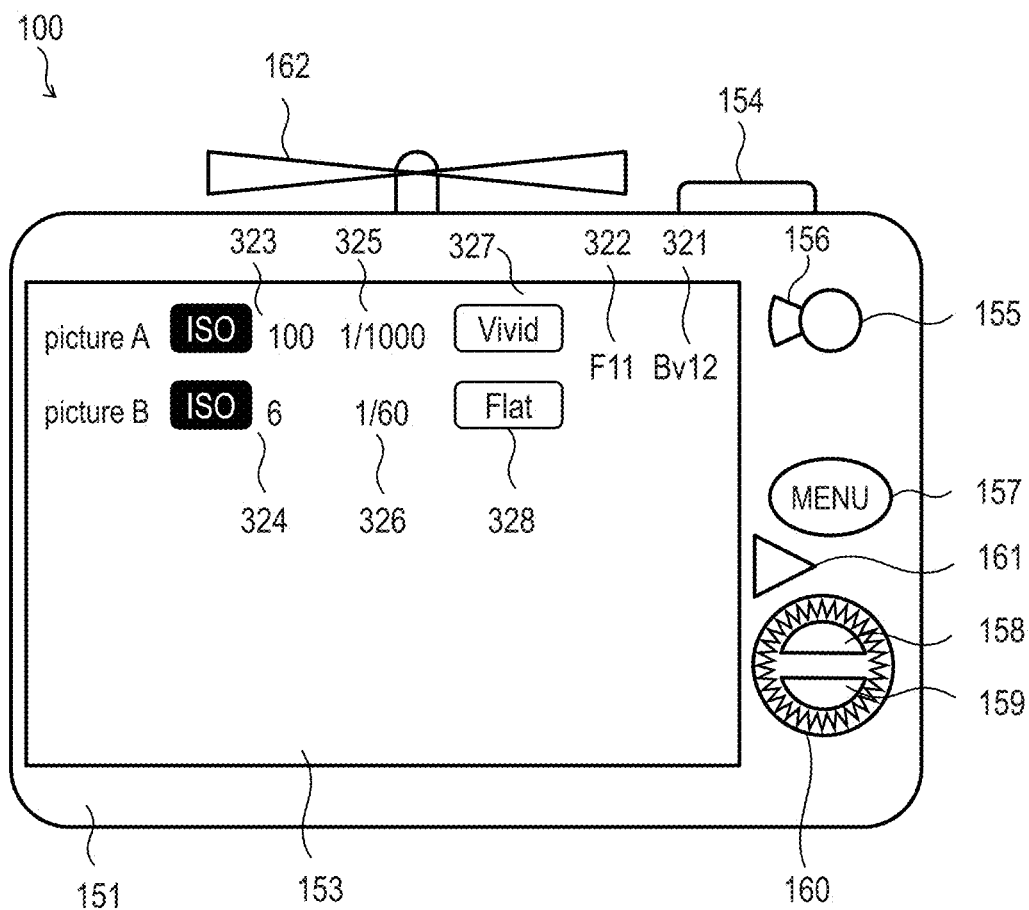
FIG. 4 is a view showing a setting screen of photographing conditions.

FIG. 4 is a view showing a setting screen of photographing conditions. FIG. 4 shows the setting screen of photographing conditions of a dual picture mode (dual image mode, dual image pickup mode) which is a photographing mode where the first image (picture A) and the second image (picture B) can be acquired in parallel. In the dual picture mode, the system controller 178 generates a first image group (first frame group) including a plurality of the first images by sequentially generating the first image, that is, picture A at a predetermined frame rate. Moreover, in the dual picture mode, the system controller 178 generates a second image group (second frame group) including a plurality of the second images by sequentially generating the second image, that is, picture B at a predetermined frame rate. Thus, in the dual picture mode, since picture A and picture B are acquired in parallel at a predetermined frame rate, an image group of pictures A and an image group of pictures B are obtained. Each of the plurality of pictures A configuring the image group of pictures A is photographed under photographing conditions suited to being appreciated as a still image. A user may select an arbitrary picture A from the image group of pictures A and employ the selected said picture A as a stilt image. On the other hand, the image group of pictures B is photographed under conditions suited to being appreciated as a moving image. The user may appreciate the image group of pictures B as a moving image. Note that as mentioned above, switching of the photographing mode may be performed by rotating the photographing mode selection lever 156. Moreover, the image pickup apparatus 100 according to the present embodiment, in addition to being able to be operated by the dual picture mode, may be operated also by a still picture photographing mode where only a still image is acquired, a moving picture photographing mode where only a moving image is acquired, and so on.

"Picture A" shown in FIG. 4 shows photographing conditions of picture A, and "picture B" shown in FIG. 4 shows photographing conditions of picture B. A Bv value 321 based on luminance of the subject and an F number 322 are displayed in the display 153. Moreover, respective ISO sensitivities 323, 324, shutter speeds 325, 326, and picture modes 327, 328 of picture A and picture B are displayed in the display 153. The user may appropriately select any picture mode of a plurality of picture modes, based on photographing purpose, and so on, by operating the likes of the up/down switches 158, 159 or the dial 160.

Figure 5:
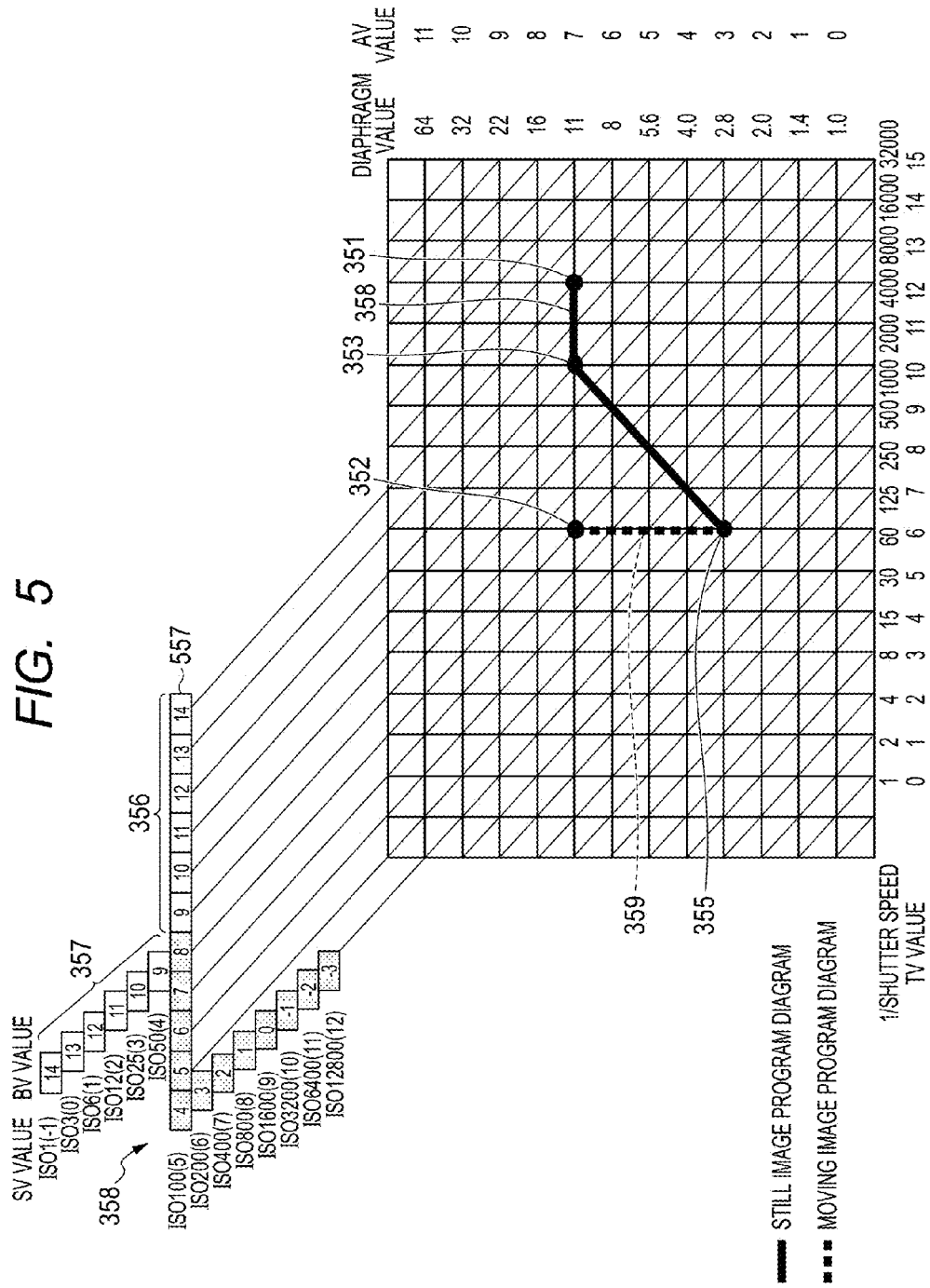
FIG. 5 is a view showing an example of a program AE diagram.

FIG. 5 is a view showing an example of a program AE (Automatic Exposure) diagram. The horizontal axis shows a Tv value and a shutter speed corresponding to the Tv value, and the vertical axis shows an Av value and a diaphragm value corresponding to the Av value. In addition, an oblique line shows an equal Bv line. A still image program diagram 358 is indicated by a thick solid line in FIG. 5, and a moving image program diagram 359 is indicated by a thick dotted line in FIG. 5. A portion indicated by a symbol 356 in FIG. 5 shows a relationship of the Bv value and the ISO sensitivity in acquisition of the still image. A portion indicated by a symbol 357 in FIG. 5 shows a relationship of the Bv value and the ISO sensitivity in acquisition of the moving image. A portion indicated by a symbol 358 in FIG. 5, that is, a dotted portion in FIG. 5 shows a relationship of the Bv value and the ISO sensitivity common to both acquisition of the still image and acquisition of the moving image. Note that a numeral indicated in parentheses on a right side of the ISO sensitivity shows a Sv value. Moreover, each of the Bv values in FIG. 5 is indicated by a numerical value surrounded by a rectangle, in order to distinguish it from another parameter.

How the shutter speed, the diaphragm value, and the ISO sensitivity change with progression from high luminance to low luminance will be described using FIG. 5. As may be understood from FIG. 5, in acquisition of the still image, when the Bv value is 14, the ISO sensitivity is set to 100. The equal Bv line of the still image when the Bv value is 14 intersects the still image program diagram 358 at a point 351. The shutter speed corresponding to the point 351 is 1/4000 second, and the diaphragm value corresponding to the point 351 is F11. Therefore, in acquisition of the still image, when the Bv value is 14, the ISO sensitivity is set to 100, the shutter speed is set to 1/4000 second, and the diaphragm value is set to F11. Incidentally, the frame rate of the moving image is 60 fps, for example. A time corresponding to one frame of the moving image when the frame rate is 60 fps is 1/60 second. Therefore, the shutter speed when acquiring the moving image is set to 1/60 second, for example, and exposure when acquiring the moving image is adjusted by adjusting the ISO sensitivity and the diaphragm value. As may be understood from FIG. 5, in acquisition or the moving image, when the Bv value is 14, the ISO sensitivity is set to 1. The equal By line of the moving image when the By value is 14 intersects the moving image program diagram 359 at a point 352. The shutter speed corresponding to the point 352 is 1/60 second, and the diaphragm value corresponding to the point 352 is F11. In this way, in acquisition of the moving image, when the By value is 14, the ISO sensitivity is set to 1, the shutter speed is set to 1/60 second, and the diaphragm value is set to F11.

As may be understood from FIG. 5, in acquisition of the still image, when the Bv value is 12, the ISO sensitivity is set to 100. The equal Bv line of the still image when the Bv value is 12 intersects the still image program diagram 358 at a point 353. The shutter speed corresponding to the point 353 is 1/1000 second, and the diaphragm value corresponding to the point 353 is F11. Therefore, in acquisition of the still image, when the Bv value is 12, the ISO sensitivity is set to 100, the shutter speed is set to 1/1000 second, and the diaphragm value is set to F11. As may be understood from FIG. 5, in acquisition of the moving image, when the Bv value is 12, the ISO sensitivity is set to 6. The equal Bv line of the moving image when the Bv value is 12 intersects the moving image program diagram 359 at the point 352. As mentioned above, the shutter speed corresponding to the point 352 is 1/60 second, and the diaphragm value corresponding to the point 352 is F11. In this way, in acquisition of the moving image, when the Bv value is 12, the ISO sensitivity is set to 6, the shutter speed is set to 1/60 second, and the diaphragm value is set to F11.

When the Bv value is 4, the ISO sensitivity is set to 100 both in acquisition of the still image and in acquisition of the moving image. The equal Bv line when the Bv value is 4 intersects the still image program diagram 358 and the moving image program diagram 359 at a point 355. The shutter speed corresponding to the point 355 is 1/60 second, and the diaphragm value corresponding to the point 355 is F2.8. In this way, when the Bv value is 4, the ISO sensitivity is set to 100, the shutter speed is set to 1/60 second, and the diaphragm value is set to F2.8 both in acquisition of the still image and in acquisition of the moving image.

When the Bv value is −3, the ISO sensitivity is set to 12800 both in acquisition of the still image and in acquisition of the moving image. The equal Bv line when the Bv value is −3 intersects the still image program diagram 358 and the moving image program diagram 359 at the point 355. As mentioned above, the shutter speed corresponding to the point 355 is 1/60 second, and the diaphragm value corresponding to the point 355 is F2.8. In this way, when the Bv value is −3, the ISO sensitivity is set to 12800, the shutter speed is set to 1/60 second, and the diaphragm value is set to F2.8 both in acquisition of the still image and in acquisition of the moving image.

Incidentally, in the present embodiment, as mentioned above, during the dual picture mode, the image group of pictures A and the image group of pictures B are acquired in parallel. As mentioned above, picture A is generated using a signal based on the charge accumulated in the charge holding section 507A, and as mentioned above, picture B is generated using a signal based on the charge accumulated in the charge holding section 507B. Moreover, as mentioned above, in the present embodiment, only one photoelectric converter 500 is provided with respect to the two charge holding sections 507A, 507B. Therefore, the photoelectric converter 500 must perform both charge accumulation for generation of picture A and charge accumulation for generation of picture B each frame. Moreover, picture A is required to be photographed at a comparatively high shutter speed, whereas picture B is required to have a comparatively slow shutter speed set in order to achieve a smooth moving image. Moreover, because picture A and picture B are acquired in parallel, picture A and picture B cannot be photographed by different diaphragm values. Accordingly, in the present embodiment, a configuration adopted whereby within a time period corresponding to one frame of the moving image, charge accumulation for generation of picture B is performed divided into a plurality of times, by the photoelectric converter 500. Moreover, a configuration is adopted whereby the charge sequentially accumulated by the photoelectric converter 500 for generation of picture B is sequentially transferred to the charge holding section 507B over a plurality of times. Moreover, a configuration is adopted whereby picture B is generated by a signal based on the charge that has been accumulated by amassment in the charge holding section 507B. In addition, in the present embodiment, a configuration is adopted whereby charge accumulation for generation of picture A is performed by the photoelectric converter 500 in an interval between charge accumulations for picture B performed by the photoelectric converter 500 divided into the plurality of times. Moreover, a configuration is adopted whereby the charge accumulated by the photoelectric converter 500 for generation of picture A is transferred to the charge holding section 507A and picture A is generated by a signal based on the charge accumulated in the charge holding section 507A. For example, in the case of acquiring picture A where the shutter speed is 1/1000 second and the diaphragm value is F11, the image pickup apparatus 100 according to the present embodiment operates as follows. That is, in a time period of 1/60 second corresponding to one frame of the moving image, a charge accumulation of 1/8000 second for picture B is performed by the photoelectric converter 500 divided into eight times. Then, the charge sequentially obtained by charge accumulation in the photoelectric converter 500 is sequentially transferred to the charge holding section 507B, and picture B is generated by a signal based on the charge summated in the charge holding section 507B. In an interval between the charge accumulations for picture B performed by the photoelectric converter 500 divided into the plurality of times, charge accumulation of 1/1000 second for picture A is performed by the photoelectric converter 500. Then, the charge sequentially obtained by charge accumulation in the photoelectric converter 500 is sequentially transferred to the charge holding section 507A, and picture A is generated by a signal based on the charge accumulated in the charge holding section 507A. When charge accumulation of 1/8000 second is performed eight times by the photoelectric converter 500 and the charge obtained by the eight times of charge accumulations is summated, it represents a charge amount equivalent to a charge accumulation of 1/1000 second. Therefore, if picture A and picture B are acquired in this way, picture A and picture B having equal exposure amounts can be obtained. Because picture A is generated based on a single time charge accumulation of 1/1000 second, a good still image having little blurring can be obtained. Moreover, because picture B is generated based on a sum total of charges obtained by eight times of charge accumulations of 1/8000 second sequentially performed at different timings, a smooth moving image can be achieved.

Incidentally, when the shutter speed during acquisition of picture A slows, that is, when a time of charge accumulation in the photoelectric converter 500 for picture A lengthens, the following occurs. That is, it becomes difficult for charge accumulation in the photoelectric converter 500 for generation of picture A to be performed in an interval between the plurality of times of charge accumulations in the photoelectric converter 500 for generation of picture B. Accordingly, in the present embodiment, a configuration is adopted whereby when the time of charge accumulation in the photoelectric converter 500 for generation of picture A is a predetermined time or more, operation is performed as follows. That is, a configuration is adopted whereby in such a case, the image pickup apparatus 100 according to the present embodiment generates picture B using not only the signal based on the charge accumulated in the charge holding section 507B but also the signal based on the charge accumulated in the charge holding section 507A.

Figure 6A:
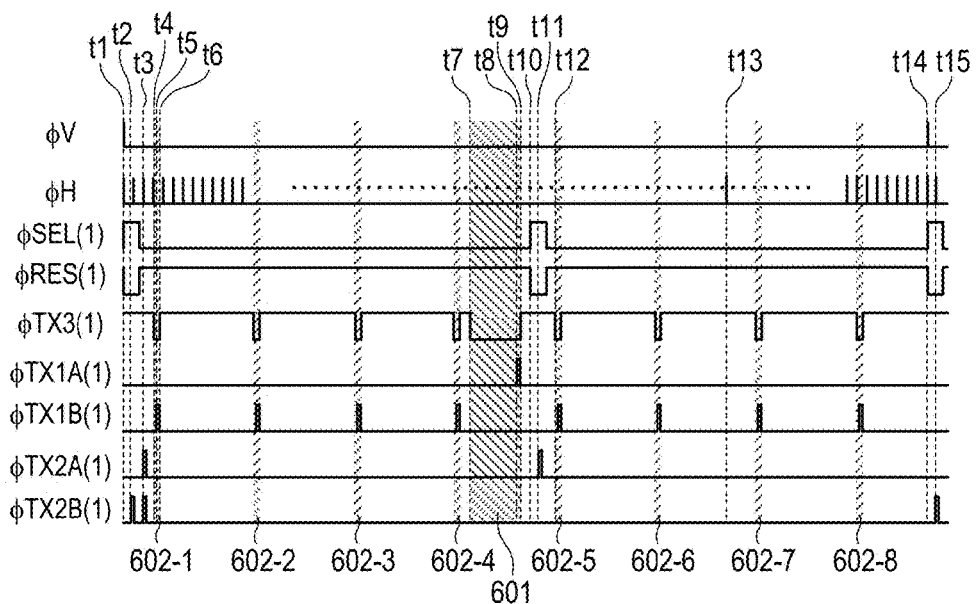
FIGS. 6A and 6B are timing charts showing operation of the image pickup apparatus according to the embodiment.
Figure 6B:
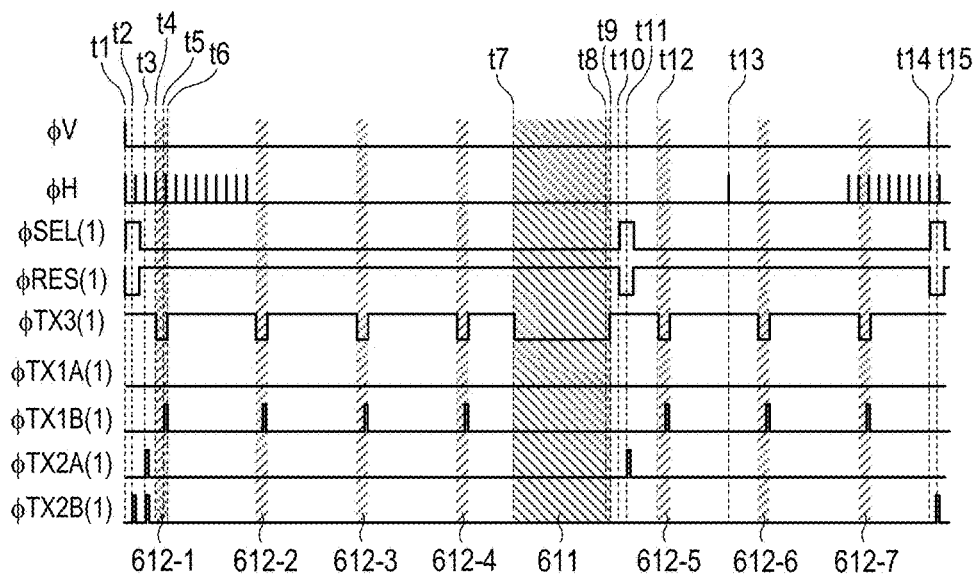

FIGS. 6A and 6B are time charts showing operation of the image pickup apparatus according to the embodiment. FIGS. 6A and 6B show as an example control of a pixel 306 positioned in the first row. Control of the kind shown. in FIGS. 6A and 6B is sequentially performed on pixels 306 positioned in each of the rows of the pixel array 302. FIG. 6A shows a case where the shutter speed during acquisition of picture A, that is, the time of charge accumulation in the photoelectric converter 500 for generation of picture A is comparatively fast. Shown here as an example is the case where the shutter speed in acquisition of picture A is 1/1000 second. In the example shown in FIG. 6A, charge accumulation of 1/8000 second is performed, spanning eight times, by the photoelectric converter 500, within the time period of 1/60 second corresponding to one frame of the moving image. Then, the charge sequentially obtained in the photoelectric converter 500 by the eight times of charge accumulations is sequentially transferred to the charge holding section 507B, and picture B is obtained by a signal based on the charge cumulatively stored in the charge holding section 507B. Timing t1 and timing t14 shown in FIGS. 6A and 6B correspond to timings of rise of a vertical synchronizing signal φV. A time from timing t1 to timing t14 is a time equivalent to one frame of the moving image, and is 1/60 second, for example.

As shown in. FIG. 6A, at timing t1, the vertical synchronizing signal φV of high level and a horizontal synchronizing signal φH of high level are outputted to the vertical scanning circuit 301, and so on, from the timing generator 189. When the vertical synchronizing signal φV of high level and the horizontal synchronizing signal φH of high level are supplied to the vertical scanning circuit 301, the vertical scanning circuit 301 sets the reset pulse φRES(1) supplied to the reset control line 319 of the first row to low level. When the reset pulse φRES(1) supplied to the reset control line 319 of the first row becomes low level, the reset transistor 504 positioned in the first row attains an OFF state, and a reset state of the floating diffusion region 508 positioned in the first row is released. Additionally at timing t1, the vertical scanning circuit 301 sets the select pulse φSEL (1) supplied to the select control line 331 of the first row to high level. When the select pulse φSEL(1) of the first row becomes high level, the select transistor 506 positioned in the first row attains an ON state, and readout of a signal from the pixel 306 positioned in the first row becomes possible.

At timing t2, the vertical scanning circuit 301 outputs the transfer pulse φTX2B(1) of high level to the transfer control line 329B of the first row. When the transfer pulse φTX2B(1) supplied to the transfer control line 329B of the first row becomes high level, the transfer transistor 502B positioned in the first row attains an ON state. When the transfer transistor 502B positioned in the first row attains an ON state, the charge accumulated in the charge holding section 507B is transferred to the floating diffusion region 508 from the charge holding section 507B. The charge transferred to the floating diffusion region 508 from the charge holding section 507B at this stage corresponds to that of the frame before. A potential of the gate of the amplifier transistor 505, that is, a potential of the floating diffusion region 508 becomes a potential based on the charge transferred to the floating diffusion region 508 from the charge holding section 507B. Then, output of the amplifier transistor 505 based on the potential of the floating diffusion region 508 is readout by the readout circuit 303 via the select transistor 506 and the output signal line 523. The signal readout in this way is employed in picture B. Note that the vertical scanning circuit 301 changes the reset pulse φRES(1) supplied to the reset control line 319 of the first row to high level at a timing between timing t2 and timing t3. Moreover, the vertical scanning circuit 301 changes the select pulse φSEL(1) supplied to the select control line 331 of the first row to low level at a timing between timing t2 and timing t3.

At timing t3, the vertical scanning circuit 301 respectively outputs the transfer pulses φTX2A(1), φTX2B(1) of high level to the transfer control lines 329A, 329B of the first row. When the transfer pulses φTX2A(1), φTX2B(1) supplied to the transfer control lines 329A, 329B of the first row become high level, the transfer transistors 502A, 502B of the first row respectively attain an ON state. At timing t3, the reset pulse φRES(1) supplied to the reset control line 319 of the first row is already at high level, hence the reset transistor 504 positioned in the first row is in an ON state. Therefore, at timing t3, the floating diffusion region 508 positioned in the first row, the charge holding section 507A positioned in the first row, and the charge holding section 507B positioned in the first row are reset.

At timing t4, the vertical scanning circuit 301 sets the reset pulse φTX3(1) supplied to the reset control line 330 of the first row to low level. When the reset pulse φTX3(1) supplied to the reset control line 330 of the first row becomes low level, the reset transistor 503 positioned in the first row attains an OFF state, and reset of the photoelectric converter 500 positioned in the first row is released. When reset of the photoelectric converter 500 positioned in the first row is released, accumulation of the signal charge to the photoelectric converter 500 positioned in the first row is started. That is, a first time charge accumulation 602-1 of eight times of charge accumulations 602 performed by the photoelectric converter 500 for generation of picture B is started. Note that symbols 602-1 to 602-8 will be employed when describing individual charge accumulations and that symbol 602 will be employed when describing charge accumulation in general.

At timing t5, the vertical scanning circuit 301 sets the transfer pulse φTX1B(1) supplied to the transfer control line 320B of the first row to high level. When the transfer pulse φTX1B(1) supplied to the transfer control line 320B of the first row becomes high level, the transfer transistor 501B positioned in the first row attains an ON state, and the signal charge accumulated in the photoelectric converter 500 is transferred to the charge holding section 507B.

At timing t6, the vertical scanning circuit 301 sets the transfer pulse φTX1B(1) supplied to the transfer control line 320B of the first row to low level. When the transfer pulse φTX1B(1) supplied to the transfer control line 320B of the first row becomes low level, the transfer transistor 501B positioned in the first row attains an OFF state, and transfer of the signal charge to the charge holding section 507B from the photoelectric converter 500 finishes. That is, the first time charge accumulation 602-1 of the eight times of charge accumulations 602 performed by the photoelectric converter 500 for generation of picture B finishes. The vertical scanning circuit 301 sets the reset pulse φTX3(1) supplied to the reset control line 330 of the first row to high level. When the reset pulse φTX3(1) supplied to the reset control line 330 of the first row becomes high level, the reset transistor 503 positioned in the first row attains an ON state, and the photoelectric converter 500 positioned in the first row attains a reset state. In this way, the first time charge accumulation 602-1 of the eight times of charge accumulations 602 performed by the photoelectric converter 500 for generation of picture B, is performed. Such a first time charge accumulation 602-1 is performed in a period from timing t4 to timing t6. That is, a second time which is a time of the charge accumulation 602 is equivalent to a time from timing t4 to timing t6. As mentioned above, timing t4 is a timing at which reset of the photoelectric converter 500 by the reset transistor 503 is released. As mentioned above, timing t6 is a timing at which transfer of the charge via the transfer transistor 501B to the charge holding section 507B from the photoelectric converter 500 finishes. In FIG. 6A, each of the charge accumulations 602 performed by the photoelectric converter 500 is expressed by marking with upwardly rightward-directed oblique lines. The second time through eighth time charge accumulations 602-2 to 602-8 are also performed similarly to the first time charge accumulation 602-1. Times of each of the charge accumulations 602 are each set to 1/8000 second, for example. Times of intervals between each of the charge accumulations 602, that is, intervals of the charge accumulations 602 are set substantially equally. In this way, in the present embodiment, the charge accumulation 602 for generation of picture B is performed discretely and uniformly over a plurality of times. The first through fourth charge accumulations 602-1 to 602-4 are performed prior to timing t7.

At timing t7, the vertical scanning circuit 301 sets the reset pulse φTX3(1) supplied to the reset control line 330 of the first row to low level. When the reset pulse φTX3(1) supplied to the reset control line 330 of the first row becomes low level, the reset transistor 503 positioned in the first row attains an OFF state, and reset of the photoelectric converter 500 positioned in the first row is released. When reset of the photoelectric converter 500 positioned in the first row is released, accumulation of the signal charge to the photoelectric converter 500 positioned in the first row is started. That is, a charge accumulation 601 for generation of picture A is started by the photoelectric converter 500.

At timing t8, the vertical scanning circuit 301 sets the transfer pulse φTX1A(1) supplied to the transfer control line 320A of the first row to high level. When the transfer pulse φTX1A(1) supplied to the transfer control line 320A of the first row becomes high level, the transfer transistor 501A positioned in the first row attains an ON state, and the signal charge accumulated in the photoelectric converter 500 is transferred to the charge holding section 507A.

At timing t9, the vertical scanning circuit 301 sets the transfer pulse φTX1A(1) supplied to the transfer control line 320A of the first row to low level. When the transfer pulse φTX1A(1) supplied to the transfer control line 320A of the first row becomes low level, the transfer transistor 501A positioned in the first row attains an OFF state, and transfer of the signal charge to the charge holding section 507A from the photoelectric converter 500 finishes. That is, the charge accumulation 601 for generation of picture A finishes in the photoelectric converter 500. The vertical scanning circuit 301 sets the reset pulse φTX3(1) supplied to the reset control line 330 of the first row to high level. When the reset pulse φTX3(1) supplied to the reset control line 330 of the first row becomes high level, the reset transistor 503 positioned in the first row attains an ON state, and the photoelectric converter 500 positioned in the first row attains a reset state. In this way, the charge accumulation 601 for generation of picture A is performed by the photoelectric converter 500. Such a charge accumulation 601 is performed in a period from timing t7 to timing t9. That is, the first time which is a time of the charge accumulation 601 is a time from timing t7 to timing t9. As mentioned above, timing t7 is a timing at which reset of the photoelectric converter 500 by the reset transistor 503 is released. As mentioned above, timing t9 is a timing at which transfer of the charge via the transfer transistor 501A to the charge holding section 507A from the photoelectric converter 500 finishes. In FIG. 6A, the charge accumulation 601 in the photoelectric converter 500 expressed by marking with downwardly rightward-directed oblique lines. The time of the charge accumulation 601 in the photoelectric converter 500 is set to 1/1000 second, for example, as mentioned above. A total charge amount obtained by performing the charge accumulation 602 of 1/8000 second eight times in the photoelectric converter 500 is equivalent to a charge amount obtained by the charge accumulation 601 of 1/1000 second. Therefore, the present embodiment makes it possible for the exposure amount of picture A and the exposure amount of picture B to be made equal.

At timing t10, the vertical scanning circuit 301 sets the reset pulse φRES(1) supplied to the reset control line 319 of the first row to low level. When the reset pulse φRES ((1) supplied to the reset control line 319 of the first row becomes low, level, the reset transistor 504 of the first row attains an OFF state, and a reset state of the floating diffusion region 508 is released. Additionally at timing t10, the vertical scanning circuit 301 sets the select pulse φSEL(1) supplied to the select control line 331 of the first row to high level. When the select pulse φSEL(1) of the first row becomes high level, the select transistor 506 positioned in the first row attains an ON state, and readout of a signal from the pixel 306 positioned in the first row, becomes possible.

At timing t11, the vertical scanning circuit 301 supplies the transfer pulse φTX2A(1) of high level to the transfer control line 329A of the first row. When the transfer pulse φTX2A(1) of high level is supplied to the transfer control line 329A of the first row, the transfer transistor 502A of the first row attains an ON state, and the signal charge accumulated in the charge holding section 507A is transferred to the floating diffusion region 508. A potential of the gate of the amplifier transistor 505, that is, a potential of the floating diffusion region 508 becomes a potential based on the charge transferred to the floating diffusion region 508 from the charge holding section 507B. Then, output of the amplifier transistor 505 based on the potential of the floating diffusion region 508 is readout by the readout circuit 303 via the select transistor 506 and the output signal line 523. The signal readout in this way, that is, the first signal is employed in generation of picture A.

The fifth through eighth charge accumulations 602-5 to 602-8 performed by the photoelectric converter 500 are performed from timing t12 onward.

At timing t14, operation similar to at timing t1 is performed. That is, at timing t14, the vertical synchronizing signal φV of high level and the horizontal synchronizing signal φH of high level are outputted from the timing generator 189, and operation for acquiring an image of the next frame is started. The reset pulse φRES(1) supplied to the reset control line 319 of the first row is set to low level, the reset transistor 504 positioned in the first row attains an OFF state, and a reset state of the floating diffusion region 508 positioned in the first row is released. In addition, the select pulse φSEL(1) supplied to the select control line 331 of the first row is set to high level, whereby the select transistor 506 positioned in the first row attains an ON state, and readout of a signal from the pixel 306 positioned in the first row becomes possible.

At timing t15, operation similar to at timing t2 is performed. That is, at timing t15, the transfer pulse φTX2B(1) of high level is outputted to the transfer control line 329B of the first row, and the transfer transistor 502B positioned in the first row attains an ON state. As a result, the charge accumulated in the charge holding section 507B is transferred to the floating diffusion region 508 from the charge holding section 507B. Then, output of the amplifier transistor 505 based on the potential of the floating diffusion region 508 is readout by the readout circuit 303 via the select transistor 506 and the output signal line 523. The signal readout in this way, that is, the second signal is employed in generation of picture B.

Note that as mentioned above, FIG. 6A shows control of a pixel 306 positioned in the first row. For example, control of a pixel 306 positioned in the second row is performed synchronously with the next horizontal synchronizing signal φH after the horizontal synchronizing signal φH supplied to the vertical scanning circuit 301 from the timing generator 189 at timing t1. Moreover, control of a pixel 306 positioned in the m-th row is performed synchronously with the horizontal synchronizing signal pH supplied to the vertical scanning circuit 301 from the timing generator 189 at timing t13. Control of a pixel 306 of all of the rows included in the pixel array 302 is sequentially started in a period from timing t1 to timing t14.

In this way, in the example shown in FIG. 6A, the charge accumulation 602 of 1/800 second for generation of picture B is performed divided into eight times, by the photoelectric conversion circuit 500, within a time period of 1/60 second corresponding to one frame of the moving image. Then, picture B is generated by a signal based on the charge summated in the charge holding section 507B. In an interval between the charge accumulations 602 for generation of picture B performed by the photoelectric converter 500 divided into a plurality of times, the charge accumulation 601 of 1/1000 second for generation of picture A is performed the photoelectric converter 500. Then, picture A is generated by a signal based on the charge accumulated Al the charge holding section 507A. When the charge accumulation 602 of 1/8000 second is performed eight times and the charge obtained by the eight times of charge accumulations 602 is summated, it results in a charge amount equivalent to the charge accumulation 601 of 1/1000 second. Therefore, if picture A and picture B are acquired. In this way, picture A and picture B having equal exposure amounts can be obtained. Moreover, because picture A is obtained by a single time charge accumulation of 1/1000 second, it results in a good image having little blurring. Moreover, because picture B is obtained by summating charges obtained by eight times of the charge accumulations 602 of 1/8000 second sequentially performed at different timings, a smooth moving image can be achieved.

FIG. 6B shows an example where the shutter speed during acquisition of picture A, that is, the time of charge accumulation performed by the photoelectric converter 500 for generation of picture A is longer than in the case shown in FIG. 6A. Shown here as an example is the case where the shutter speed during acquisition of picture A is 1/500 second. In the example shown in FIG. 6B, a charge accumulation 612 of 1/4000 second is performed over a plurality of times by the photoelectric converter 500, within the time period of 1/60 second corresponding to one frame of the moving image. Note that symbols 612-1 to 612-7 are employed when describing individual charge accumulations, and symbol 612 is employed when describing the charge accumulation in general. Then, the charge sequentially obtained by the plurality of times of charge accumulations 612 performed in the photoelectric converter 500 is accumulated in the charge holding section 507B, and a signal based on the charge cumulatively stored in the charge holding section 507B is employed in generation of picture B. Basic control is similar to in the case shown. in FIG. 6A, also in the case shown in FIG. 6B.

If the charge accumulation 612 of 1/4000 second is performed eight times, at results in a charge amount equivalent to a charge accumulation. 611 of 1/500 second. However, in the case shown in FIG. 6B, a time of the charge accumulation 611 in the photoelectric converter 500 for generation of picture A is longer than a time of an interval between the charge accumulations 612 in the photoelectric converter 500 for generation of picture B. Therefore, in the case shown in FIG. 6B, the charge accumulation 612 of 1/4000 second for generation of picture B is only performed seven times in the photoelectric converter 500. That is, in the case shown in FIG. 6B, a single time portion of the charge accumulation 612 for generation of picture B is weeded out. When picture B is simply generated by a signal based on the charge accumulated in the charge holding section 507B regardless of a weeding-out of the charge accumulation 612 having occurred, an exposure amount of picture B ends up being smaller than an exposure amount of picture A. That is, exposure of picture B ends up being under. Moreover, if picture B is generated by summating the charges obtained by a discretely and uniformly performed plurality of times of charge accumulations 602, it is possible to obtain a smooth moving image. However, in the case that a weeding-out of the charge accumulation 612 like that of FIG. 6B has occurred, there is a risk that it ends up resulting in an unnatural moving image whose smoothness has been lost. Accordingly, in the present embodiment, in the case that the tame of the charge accumulation 611 for generation of picture A is longer than a predetermined time, that is, in the case that a weeding-out occurs in the charge accumulation 612 for generation of picture B, the following kind of processing is performed. That is, in the present embodiment, a configuration is adopted whereby in such a case, picture B is generated using a signal obtained by the charge accumulation 611 for generation of picture A and a signal obtained by the charge accumulation 612 for generation of picture B.

The number of times of transfers of charge per one frame to the charge holding section 507B from the photoelectric converter 500 in the case that a weeding-out is not performed, that is, in the first case, is assumed to be a. The number of times of transfers of charge per one frame the charge holding section 507B from the photoelectric converter 500 in the case that a weeding-out is performed, that is, in the second case, is assumed to be b. The signal in coordinate (m, n) of picture A is assumed to be Is(m, n), and the signal in coordinate (m, n) of picture B is assumed to be Im(m, n). The signal in coordinate (m, n) of picture B generated using the signal obtained by the charge accumulation 611 for generation of picture A and the signal obtained by the charge accumulation 612 for generation of picture B, is assumed to be Im'(m, n). That being the case, IM'(m, n) is expressed by the following equation (1).

$$Im'(m,n)=Im(m,n)+\{(a-b)/a\}33\ Is(m,\ n) \quad (1)$$

In this way, when a weeding-out is performed, picture B, that is, the second image is generated based on the second signal for generation of picture B and a value obtained by multiplying the first signal for generation of picture A by (a−b)/a.

In the case like that of FIG. 6B, if picture B is generated in this way, a smooth moving image can be obtained even when the time of the charge accumulation. 602 for generation of picture A is comparatively long. Note that in the example shown in FIG. 6B, the charge accumulation 611 for generation of picture A is positioned substantially in between the charge accumulation 612-4 for generation of picture B and the charge accumulation 612-5 for generation of picture B. In other words, in the second case, a timing of the charge accumulation 611 for generation of picture A, that is, a center of a time period of the charge accumulation 611 performed by the photoelectric converter 500 generating the charge to be transferred to the charge holding section 507A, is set in the following way. That is, the charge accumulation 612-4 is the charge accumulation immediately before the charge accumulation. 611, of the plurality of times of charge accumulations 612. The charge accumulation 612-5 is the charge accumulation immediately after the charge accumulation 611, of the plurality of times of charge accumulations 612. The center of the time period of the charge accumulation 611 is set so as to coincide with a center of a time period from timing of the charge accumulation 612-4 to timing of the charge accumulation 612-5. Setting the timing of the charge accumulation 611 for generation of picture A in this way makes it possible for a smoother moving image to be obtained.

Figure 7:
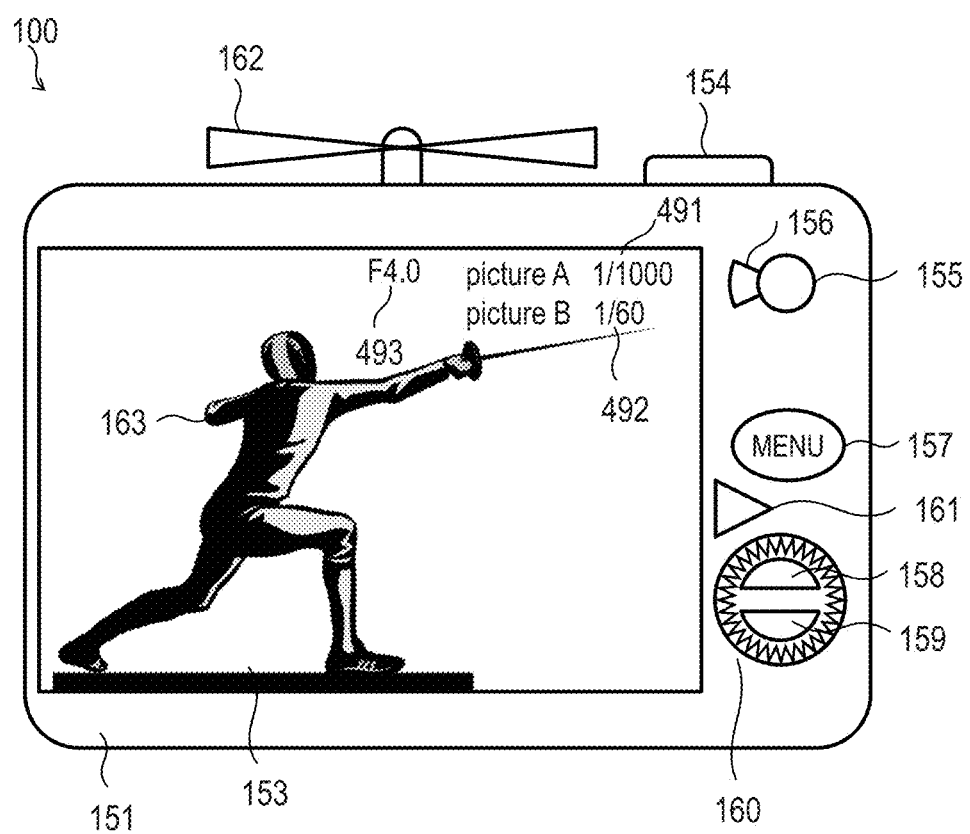
FIG. 7 is a view showing an example of a live view display.

FIG. 7 is a view showing an example of a live view display. A sports scene of a FIG. 163 captured using the photographing optical system 152 is displayed in the display 153. Moreover, because the photographing mode selection lever 156 is in a position rotated 90 degrees in a clockwise direction with respect to a state shown in FIG. 1B, the photographing mode is in the dual picture mode. Therefore, shutter speeds 491, 492 and an F number 493 of picture A and picture B are displayed in the display 153.

Figure 8:
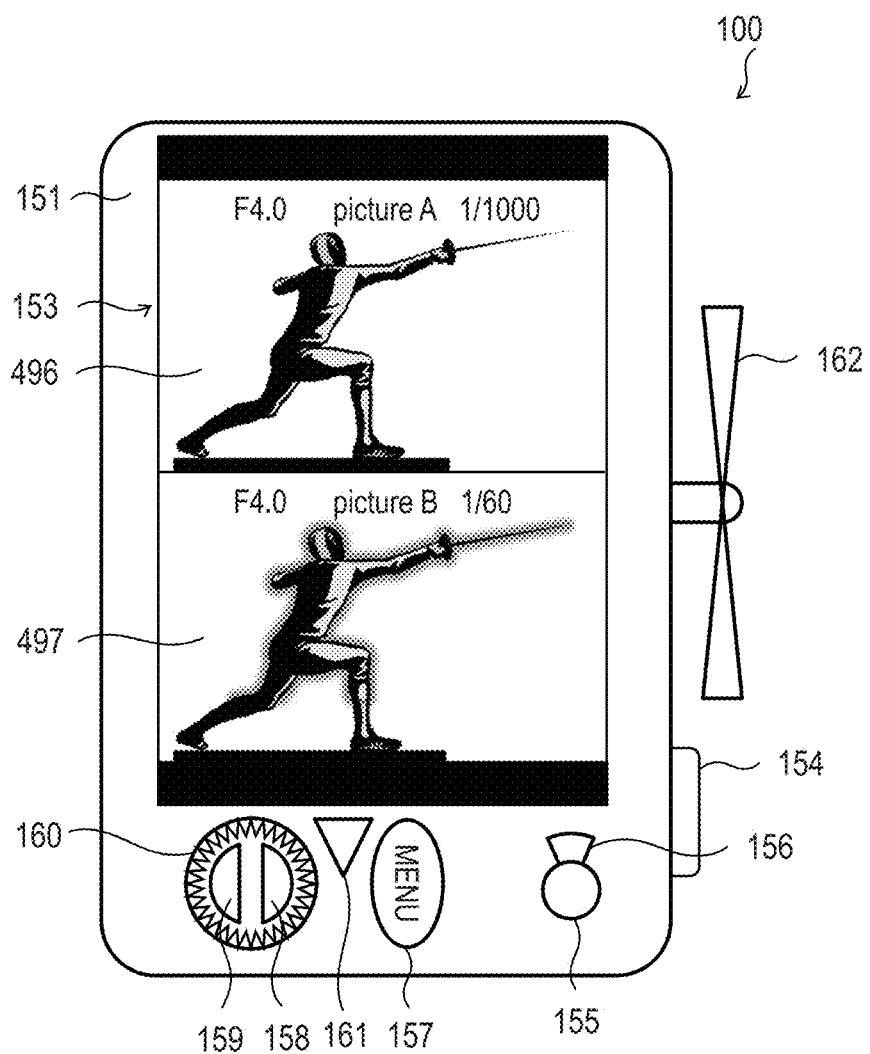
FIG. 8 is a view showing an example of when both picture A and picture B have been displayed in line.

FIG. 8 is a view showing an example of when both picture A and picture B have been displayed in line. A configuration is preferably adopted whereby when the reproduction button 161 has been operated by the user, both picture A and picture B are displayed in line as shown in FIG. 8. Shown here as an example is the case where picture A is displayed in a portion 496 on an upper side of the display screen of the display 153, and picture B is displayed in a portion 497 on a lower side of the display screen of the display 153. Displaying picture A and picture B aligned in this way makes it possible for picture A and picture B to be easily compared. For example, it can be confirmed that picture A is acquired at a high shutter speed and that picture A expresses a moment of a sports scene extremely powerfully. Note that although what has been described here as an example is the case where picture A and picture B are displayed in the display 153 of the image pickup apparatus 100, the present embodiment is not limited to this. For example, it is possible to configure so as to supply data of an image group of pictures A and data of an image group of pictures B, to a system or apparatus, via a network, and perform display of picture A and picture B on a side of that system or apparatus.

FIG. 9 is a view showing an application example of the image group of pictures A and the image group of pictures B. A data file of pictures A and pictures B may be stored in the recording medium 193 or may be stored in the likes of storage on a network. A frame group 581 is a frame group of pictures A stored in an MP4 file, for example. A frame group 571 is a frame group of pictures B stored in another MP4 file. These MP4 files are associated with each other by having the same CLIP-UMID set during photographing, for example.

First, when reproduction of the frame group 571 of pictures B, that is, reproduction of the moving image is started, sequential reproduction performed at a predetermined frame rate from a lead frame 572 of the frame group 571 of pictures B. Since the frame group of pictures B is a frame group that has been acquired as described above, a smooth moving image is reproduced.

If the user performs an operation of temporary stop at a time point when reproduction of the frame group 571 of pictures B has progressed to frame 573, frame 582 that has a time code identical to that of frame 573 is retrieved from the data file of pictures A. Then, picture A of frame 582 is displayed in the display 153. Because picture A is an image photographed at a high shutter speed of, for example, 1/1000 second, a powerful moment of a sports scene can be expressed.

The shutter speed of picture A is, for example, 1/1000 second, as mentioned above. On the other hand, the shutter speed of picture B is, for example, 1/60 second which is the time corresponding to one frame of the moving image. Although shutter speeds are significantly different for picture A and picture B, it is not the case that gain differs greatly for picture A and picture B and they are generated based on the same level of signal charge. Therefore, both picture A and picture B are good images having a high S/N ratio and low noise sensation.

When the user performs a print instruction by operating the input unit 179, image data of picture A of frame 582 is outputted to the printer 195 via the print interface 194. Because picture A is printed, a printout expressing a powerful moment of a sports scene is obtained When the user instructs release of temporary stop by operating the input unit 179, reproduction of the frame group 571 of pictures B is resumed. Specifically, reproduction is resumed from frame 574. Since picture B that has been acquired as described above is employed in reproduction of the moving image, a smooth moving image can be appreciated.

In this way, as a result of the present embodiment, the first image, that is, picture A is generated by the first signal which is based on the charge transferred to the charge holding section 507A from the photoelectric converter 500. Moreover, the second image, that is, picture B generated using at least the second signal which is based on the charge transferred over a plurality of times to the charge holding section 507B from the photoelectric converter 500. In the first case where the time of the charge accumulation in the photoelectric converter 500 for generating the charge corresponding to the first signal is less than a predetermined time, the second image, that is, picture B is generated by the second signal without using the first signal. On the other hand, in the second case where the time of the charge accumulation in the photoelectric converter 500 for generating the charge corresponding to the first signal is the predetermined time or more, the second image, that is, picture B is generated using the first signal and the second signal. Therefore, as a result of the present embodiment, a high quality still image of a desired shutter speed can be obtained and a smooth high quality moving image can be obtained both in the first case and in the second case. That is, in the present embodiment, a still image of a desired shutter speed and a smooth high quality moving image can be obtained in spite of charge accumulation for picture A and charge accumulation for picture B being performed exclusively using the common photoelectric converter 500. In this way, the present embodiment makes it possible to provide an image pickup apparatus by which an image group suited to a still image and an image group suited to a moving image can be acquired using a common photoelectric converter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory' computer-readable storage medium) to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one o more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM)), a read only memory (ROM), a storage of distributed computing systems, an optical disk (such as a compact disc (CD), digital versatile disc (DVD), or Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the above-described embodiment described as an example the case where the number of times a of transfers of charge per one frame to the charge holding section 507B from the photoelectric converter 500 was set to eight times. However, the present invention is not limited to this. The number of times a of transfers of charge per one frame to the charge holding section 507B from the photoelectric converter 500 may be 16 times or 32 times, for example.

Moreover, the above-described embodiment described using FIG. 6B an example of the case where the number of times of weeding-outs of the charge accumulation 612 was one time per one frame. However, the present invention is not limited to this. The number of times of weeding-outs of the charge accumulation 612 per one frame may be a plurality of times.

Moreover, the above-described embodiment described as an example the case where the number of times of transfers of charge per one frame to the charge holding section 507A from the photoelectric converter 500 was one time. However, the present invention is not limited to this. For example, the number of times of transfers of charge per one frame to the charge holding section 507A from the photoelectric converter 500 may be a plurality of times. That is, the number of times per one frame of the charge accumulation 601 performed by the photoelectric converter 500 for generation of picture A may be a plurality of times.

This application claims the benefit of Japanese Patent Application No. 2016-222579, filed Nov. 15, 2016, which is hereby incorporated by reference herein in its entirety.

What is claimed is:

1. An image pickup apparatus, comprising:
    a pixel array having a plurality of pixels arranged two-dimensionally therein, the plurality of pixels each including: a photoelectric converter that performs photoelectric conversion; a first charge holding section that holds a charge obtained due to a first charge accumulation by the photoelectric converter; and a second charge holding section that holds a charge obtained due to a plurality of times of second charge accumulations by the photoelectric converter; and
    a controller, the controller generating a first image by a first signal which is based on the charge obtained by the first charge accumulation performed within a first time period corresponding to one frame of an image group, the controller generating a second image using at least a second signal which is based on the charge obtained by the plurality of times of second charge accumulations performed within the first time period, and the controller, in a first case where a time of the first charge accumulation is less than a predetermined time, generating the second image by the second signal without using the first signal, and in a second case where the time of the first charge accumulation is the predetermined time or more, generating the second image using the first signal and the second signal.

2. The image pickup apparatus according to claim 1, wherein
    the predetermined time is a time based on a time of an interval between the plurality of times of second charge accumulations.

3. The image pickup apparatus according to claim 1, wherein
    when the number of times of the second charge accumulations in the first case is assumed to be a and the number of times of the second charge accumulations in the second case is assumed to be b, the controller generates the second image using the second signal and a value obtained by multiplying the first signal by (a−b)a.

4. The image pickup apparatus according to claim 1, wherein
    in the second case, a center of a time period of the first charge accumulation is set so as to coincide with a center of a time period from a timing of the second charge accumulation immediately before the first charge accumulation of the plurality of times of second charge accumulations to a timing of the second charge accumulation immediately after the first charge accumulation of the plurality of times of second charge accumulations.

5. The image pickup apparatus according to claim 1, wherein
    the controller generates a first image group including a plurality of the first images by sequentially generating the first image at a predetermined frame rate and generates a second image group including a plurality of the second images by sequentially generating the second image at the predetermined frame rate.

6. The image pickup apparatus according to claim 1, wherein
    the first image is employed in a still image, and the second image is employed in a moving image.

7. The image pickup apparatus according to claim 1, wherein
    the first charge accumulation and the second charge accumulation are performed exclusively.

8. The image pickup apparatus according to claim 1, wherein
    a sum total of times of the plurality of times of second charge accumulations in the first case is equivalent to a time of the first charge accumulation in the first case.

9. The image pickup apparatus according to claim 1, wherein
    a first transfer transistor that transfers to the first charge holding section the charge obtained by the first charge accumulation, a second transfer transistor that transfers to the second charge holding section the charge obtained by the second charge accumulation, and a reset transistor that resets the photoelectric converter, are connected to the photoelectric converter,
    a time of the first charge accumulation is a time from a timing at which reset on the photoelectric converter by the reset transistor is released to a timing at which transfer of charge by the first transfer transistor to the first holding section from the photoelectric converter finishes, and
    a time of the second charge accumulation is a time from a timing at which reset of the photoelectric converter by the reset transistor is released to a timing at which transfer of charge by the second transfer transistor to the second holding section from the photoelectric converter finishes.

10. An image pickup method, comprising:
    generating a first image by a first signal which is based on a charge obtained due to a first charge accumulation by a photoelectric converter performed within a first time period corresponding to one frame of an image group; and
    generating a second image using at least a second signal which is based on a charge obtained due to a plurality of times of second charge accumulations by the photoelectric converter performed within the first time period, the second image, in a first case where a time of the first charge accumulation is less than a predetermined time, being generated by the second signal without using the first signal, and the second image, in a second case where the time of the first charge accumulation is the predetermined time or more, being generated using the first signal and the second signal.

11. A non-transitory computer-readable storage medium having stored thereon a program for causing a computer to execute:
    generating a first image by a first signal which is based on a charge obtained due to a first charge accumulation by a photoelectric converter performed within a first time period corresponding to one frame of an image group; and generating a second image using at least a second signal which is based on a charge obtained due to a plurality of times of second charge accumulations by the photoelectric converter performed within the first time period, the second image, in a first case where a time of the first charge accumulation is less than a predetermined time, being generated by the second signal without using the first signal, and the second image, in a second case where the time of the first charge accumulation is the predetermined time or more, being generated using the first signal and the second signal.

* * * * *